United States Patent
Bordaz et al.

(10) Patent No.: US 6,272,612 B1
(45) Date of Patent: Aug. 7, 2001

(54) PROCESS FOR ALLOCATING MEMORY IN A MULTIPROCESSOR DATA PROCESSING SYSTEM

(75) Inventors: Thierry Bordaz, Doméne; Patrice Romand, Seyssinet; Jean-Dominique Sorace, Lancey, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/145,642

(22) Filed: Sep. 2, 1998

(30) Foreign Application Priority Data

Sep. 4, 1997 (FR) .................................................. 97 11025
Jun. 25, 1998 (FR) .................................................. 98 08058

(51) Int. Cl.$^7$ ..................................................... G06F 12/00
(52) U.S. Cl. ......................... 711/203; 711/216; 711/209; 711/170; 711/171; 711/172; 711/173; 711/147; 711/148; 711/153
(58) Field of Search ................................... 711/203, 216, 711/209, 170, 171, 172, 173, 147, 148, 153

(56) References Cited

U.S. PATENT DOCUMENTS 6,021,479 * 2/2000 Stevens ................................ 711/170
6,105,053 * 8/2000 Kimmel et al. ....................... 709/105

FOREIGN PATENT DOCUMENTS 0750255  12/1996 (EP) .

OTHER PUBLICATIONS

Larowe et al.—IEEE—"Evaluation of NUMA Memory Management Through Modeling and Measurements"; vol. 3, No. 6 Nov. 1992.*

Zhang et al.—IEEE—"Improving Distributed Workload Performance by Sharing Both CPU and Memory Resources", Nov. 2000.*

Bach et al.—IBM TBD—"Modified LRU Page Replacement Algorithm"; vol. 23, No. 8 Nov. 1992.*

Krueger, K. et al.: "Tools for the Development of Application-Specific Virtual Memory Management" ACM Sigplan Notices, vol. 28, No. 10, Oct. 1, 1993, pp. 48–64, XP000411717.

Larowe Jr., R.P. et al.: "Page Placement Policies for Numa Multiprocessors" Journal of Parallel and Distributed Computing, vol. 11, No. 2, Feb. 1, 1991, pp. 112–129 XP000201935.

Jayashree Ramanathan et al. "Critical Factors in Numa Memory Management", Int'l Conference on Distributed Computing Systems, Arlington, Texas, May 20–24, 1991, No. Conf. 11, May 20, 1991, Institute of Electrical and Electronics Engineers, pp. 500–507, XP000221890.

* cited by examiner

Primary Examiner—Do Hyun Yoo
Assistant Examiner—Kimberly McLean
(74) Attorney, Agent, or Firm—Miles & Stockbridge P.C.; Edward J. Kondracki (57) ABSTRACT

The invention relates to a process for allocating physical memory locations in a multiprocessor data processing system comprising a non-uniform access memory unit distributed among a plurality of modules. Software applications are linked to a set of predefined memory allocation rules. When there is no entry for a virtual address in an address correspondence table, there is a generation of a page fault, and the allocation of a location in physical memory is carried out in accordance with a predefined rule as a function of the profile of the application and of the page fault type. The memory may be organized into segments and the segments subdivided into virtual address ranges, with the ranges associated with a specific memory allocation policy. In the case where there is an entry for a virtual address in an address correspondence table, the policy of the segment prevails.

23 Claims, 5 Drawing Sheets

VIRTUAL ADDRESS SPACE

PROCESS FOR ALLOCATING MEMORY IN A MULTIPROCESSOR DATA PROCESSING SYSTEM

TECHNICAL FIELD

The present invention relates to a process for allocating memory in a multiprocessor data processing system, more specifically a process for allocating a memory having non-uniform access.

Within the scope of the invention, the term "non-uniform" is intended in a temporal sense, as will be shown. Likewise, the term "a memory" is intended in a general sense. It can indicate a distributed memory, a memory hierarchy (for example comprising banks of memories with different access times), or a set of memories of different types.

BACKGROUND OF THE INVENTION

As is well known in the data processing field, it is possible to increase the power of a machine by increasing the number of processors of which it is composed. "Symmetrical Multiprocessor" (SMP) allows different processors in the same machine to access its memory symmetrically by means of a system bus. These are machines with uniform access memory, inasmuch as the access time to the memory is substantially the same for all of the data accessed.

For this reason, the architecture is called "UMA" (a "Uniform Memory Access").

Figure 1:
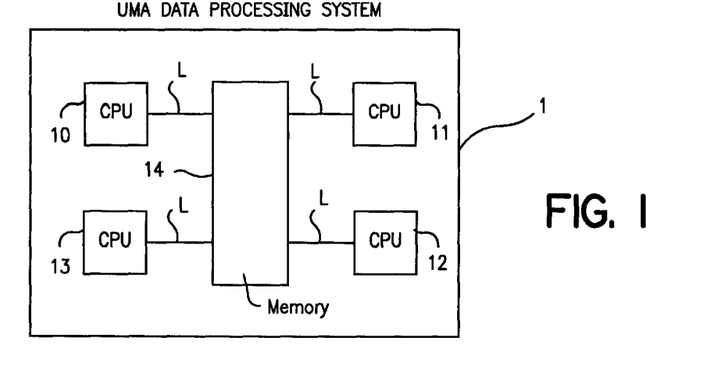
FIG. 1 schematically illustrates a "UMA" architecture of a data processing system with uniform memory access.

FIG. 1 attached to the present specification schematically illustrates an example of the "UMA" type architecture.

The data processing system 1, which hereinafter will be called the "SMP" module, comprises a certain number of central processing units or processors, or "CPU". Four central processing units (CPUS) are represented in the example of FIG. 1: 10 through 13. Associated with these central processing units 10 through 13 is a main memory 14 accessible by all of them via an access line L.

Since all the accesses take place within the module 1, that is, locally, and if the total available memory space is homogeneous in terms of access time, (which constitutes the initial hypothesis, since this is a "UMA" architecture), the access time remains substantially the same, no matter which central processor 10 through 13 has sent a request.

Although only four central processors 10 through 13 have been represented in FIG. 1, it should be clear that this number is completely arbitrary. It can be increased or decreased. However, the performance curve of machines of this type does not increase in linear fashion as a function of the number of processors. An increased number of processors causes the system to consume more time for problems of accessibility to its resources that it has available for running applications. The consequence of this is to considerably lower the performance curve when the number of processors exceeds an optimum value, often estimated at about 4. The prior art proposes various solutions to this problem.

One known solution consists of grouping a plurality of machines into clusters so as to have them communicate with one another through a network. Each machine has an optimal number of processors, for example four, and its own operating system. It establishes a communication with another machine every time it performs an operation on data maintained by this other machine. The time required for these communications and the need to work on consistent data causes latency problems for high-volume applications such as, for example, distributed applications which require numerous communications. Latency is the time that separates the instant at which a request for access to the memory is sent, and the instant at which a response to this request is received.

Another known solution is that of machines with a "Non-uniform Memory Access" (NUMA) architecture. These are machines with non-uniform access memory, inasmuch as the access time to the memory varies depending on the location of the data accessed. A "NUMA" type machine is constituted by a plurality of modules, each module comprising an optimal number of processors and a physical part of the total memory of the machine. A machine of this type has non-uniform memory access because a module generally has easier and faster access to a physical part of the memory that it does not share with another module than to a part that it shares. Although each module has a private system bus linking its processors with its physical memory, an operating system common to all the modules allows all of the private system busses to be considered as a single, unique system bus of the machine. A logical address assigns a place of residence to a given physical memory location of a module. For a specific processor, accesses to a local memory part physically located in the same module as the processor are distinguished from accesses to a remote memory part, physically located in one or more modules other than the one in which the processor is located.

Figure 2:
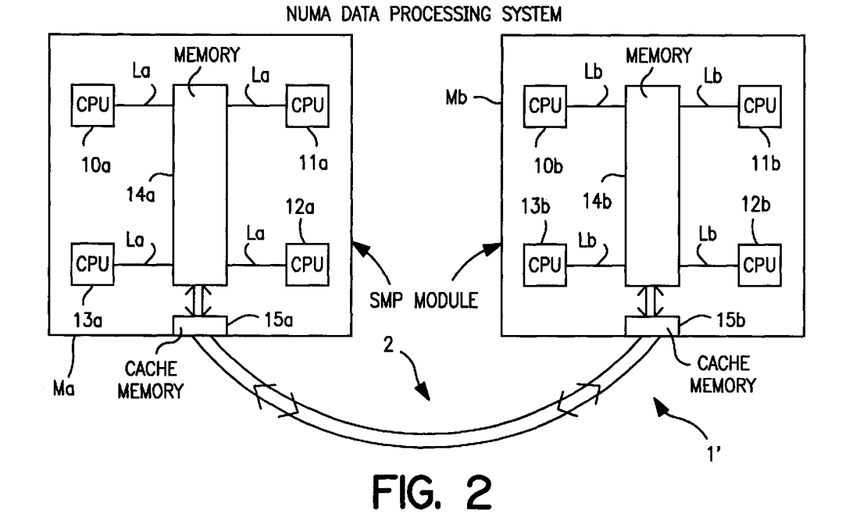
FIG. 2 schematically illustrates a "NUMA" architecture of data processing system with non-uniform memory access.

FIG. 2 attached to the present description schematically illustrates an example of this type of architecture, that is, a "NUMA" architecture. To simplify the drawing, it has been assumed that the data processing system 1' comprises only two modules, Ma and Mb, of the above-mentioned "SMP" type, and that the two modules are identical. It must be understood, however, that the data processing system 1' can comprise a greater number of modules and that the modules Ma and Mb can be different (particularly in terms of the number of central processors).

The module Ma comprises four central processors 10a through 13a, and a main memory 14a. Likewise, the module Mb comprises four central processors 10b through 13b, and a main memory 14b. The two memories 14a and 14b (and more generally the n main memories) communicate with one another by means of what is called a "link" 2, generally via so-called remote cache memories 15a and 15b, respectively. The link 2 does not correspond to simple physical links, but comprises various standard electronic circuits (control circuits, interface circuits, etc.) that do not need to be described any further because they are well known in the prior art.

It is easy to understand that, in an architecture of this type, if an application is running in the module Ma, for example, the access time to the "near" memory 14a (local access) is, a priori, less than the access time to the "far" memory 14b located in the module Mb, no matter which central processor 10a through 13a is involved. It is specifically necessary to pass through the link 2 when the data are physically stored in another module, which substantially increases the transfer time.

In modern data processing systems, the allocation of the memory for a given application is carried out on the basis of a virtual memory space. This allocation is placed under the control of the operating system or "OS." A dynamic correspondence is then established between the virtual memory space and the physical memory. For this purpose, it is customary to use address correspondence tables called dynamic "mapping". Various types of memory configurations have been proposed, including organization by regions or by segments. To explain the concepts without in any way limiting the scope of the invention, the case of a "segment" type configuration will be described below. In practice, a segment is defined as a space of contiguous virtual addresses, of fixed and predetermined length.

More precisely, in the prior art, the above-mentioned dynamic correspondence or "mapping" is carried out in accordance with rules common to all the applications, no matter what their types, without taking into account the location of the physical memory. In practice, if a process intends to access a virtual address and no entry in the address correspondence table is found, an exception is generated, which is formalized by the detection of a page fault, according to the "UNIX" (registered trademark) terminology. The term "page" can be defined more generally as being a "range of contiguous addresses." A page constitutes a subdivision of a segment. However, for purposes of simplification, the term "page" will be used below. After a detection of a page fault, a device called a handler allocates physical memory in accordance with the above-mentioned common rules. This simple allocation method is entirely suitable for the standard "SMP" machines of the above-mentioned "UMA" type, since the average access time to the memory is uniform.

On the other hand, with an architecture of the "NUMA" type as described in regard to FIG. 2, for which the access time is no longer uniform, the need arises for a memory allocation process that minimizes the negative impact on the performance of the system.

In the prior art, processes for this purpose have been proposed. For example, it has been proposed that the memory allocation rules be modified in order to obtain an optimization, but once modified, the rules remain identical for all the applications. Moreover, this process has additional drawbacks. The modified rules may be advantageous for one specific application, but inappropriate or even dangerous for another.

It has also been proposed that specific "Application Program Interface", adapted so as to define a specific algorithm associated with a given application, be used to establish the correspondence ("mapping") between the virtual memory space and the physical memory, but in this case, it is necessary to modify both the corresponding applications and the resident part of the operating system ("kernel"). Therefore, this method cannot be applied on its own to the existing programs. In any case, it lacks flexibility and its effectiveness is limited.

SUMMARY OF THE INVENTION

The subject of the invention is a memory allocation process for a data processing system with non-uniform access to the main memory, particularly of the above-mentioned "NUMA" type, which is intended to fulfill the needs that arise with this particular architecture, and which does not have the drawbacks of the processes of the prior art.

For this purpose, the memory allocation is carried out as a function of the profile specific to each application, that is, by implementing a set of allocation rules which take this profile into account, among which a search is automatically performed upon each page fault detected, in order to determine which one must be executed for the physical memory allocation.

In a preferred embodiment, the physical memory allocation is also carried out so as to take into account the type of page fault. In effect, during its execution, an application is subdivided into different objects such as text, data, shared memory, etc., which use the global memory space of the system differently. The invention also makes it possible to optimize the memory accesses as a function of this parameter.

The process of the invention, in the variants just mentioned, offers quite a significant improvement relative to the prior art, particularly in terms of better performance and great flexibility. Moreover, it is not necessary to modify the existing applications. However, it must be noted that in practice, the virtual address space of a multiprocessor data processing system, particularly of the "NUMA" type, is usually very large. To explain the concepts, if the operating system is in the above-mentioned "UNIX" environment or one of its variants, a single virtual memory segment usually represents 256 MB. It is easy to understand that, under these conditions, the one rule per segment may not be optimal for a certain number of applications, even if this segment is associated with only one class: "data type," for example. Moreover, it is usual to subdivide a segment into virtual address sub-spaces, which hereinafter will be called "virtual ranges,". The various address areas of a segment corresponding to these virtual ranges may be used in different ways.

Unlike a page, which is itself a subdivision of a segment, the "virtual ranges" thus defined can have variable lengths. In practice, it is acknowledged that, in the preferred exemplary application ("UNIX" environment), the granularity of the virtual ranges can fall below the level of the page.

To explain the concepts, it is possible, for example, to reserve a virtual range of 50 MB for a table defining a physical buffer memory for the purpose of reading data recorded on a disk, by means of an input-output controller.

Even when limited to this one example, it is understood that in the case of a "NUMA" architecture, the location of the buffer memory in one of the physical memories of the system, with respect to the module to which the above-mentioned disk is connected and the specific application using these data, is not insignificant in terms of performance.

Also, according to an additional variant of the invention, and again according to a preferred embodiment, a specific memory allocation policy is selectively associated with each of the virtual "ranges." This technical characteristic makes it possible to further optimize the memory allocations in case of the detection of a page fault, in exchange for limited modifications made to the applications for which this variant of the process is implemented.

According to this variant, when there is a generation of an exception, which translates into a page fault, the handler responsible for finding the rule to be executed scans a table in order to determine whether a specific allocation policy associated with this virtual range exists. If this specific policy does not exist, the policy governing the hierarchically higher unit constituted by the segment is adopted. In the opposite case, a memory allocation rule is derived from this specific policy. In other words, the same segment can comprise one or more virtual "ranges," each of which is associated with a specific memory allocation policy, at the same time that one or more other virtual ranges are obeying the general policy of the segment, or even of the system, and the rules that follow from it. It must be clear that the term "specific" does not necessarily imply that the allocation policy associated with a given range, arbitrarily labelled n (with n being between 1 and m, if the segment comprises m ranges), is different from that associated with one or more other virtual ranges, for example the virtual ranges n+2 and n+5.

In practice, list structures are used to determine which memory allocation rule it is necessary to use, each element of the list corresponding to a range of contiguous addresses, delimited by the start and end addresses of the virtual range. In a practical way, an element of the list is a memory location storing the memory allocation rules that apply to a given virtual range. The various elements of the list are scanned, sequentially, to determine which rules must be applied.

This process can also be accelerated. According to an additional variant of this implementation of the invention, the segments are subdivided into N sub-spaces of contiguous virtual addresses, all of the same length. A so-called "hash" table, which also comprises N entries, is established. Associated with these N entries is an equal number of individual list structures. The length of the individual list structures is not fixed. It depends on the number of virtual ranges associated with this entry. When a page fault is detected, the address handler H knows the address that caused the page fault. It is therefore easy for it to determine the number of the corresponding entry in the table.

The "hash" table is constituted by N memory locations, each location storing at least one piece of information on the existence of a virtual range associated with this entry, which necessitates the use of a specific memory allocation policy. In practice, when a page fault is detected, its entry in the table is read, and when a pointer characteristic of the presence of a specific allocation policy exists, there follows, in a supplementary step, the determination of which of the above-mentioned virtual ranges of the segment is associated with this page fault. For the segments which do not comprise any virtual ranges associated with a specific policy, the policy to be applied is that of the segment in its entirety. On the other hand, for the virtual ranges that require specific memory allocation policies, it is necessary to scan one or more elements of a list structure associated with a particular entry of the table. However, the length of this list structure is much more limited than in the preceding case, since it covers only the virtual ranges associated with this entry. As a result of these two characteristics, the variant of embodiment just described substantially accelerates the memory allocation process, at least the phase for determining the rules to be applied.

Thus, the subject of the invention is a process for allocating physical memory locations by mapping with at least one range of contiguous memory addresses in a virtual address space associated with a given software application, the application being run in a data processing system comprising a non-uniform access memory unit and using a plurality of virtual memory types, this mapping being carried out by scanning an address correspondence table, characterized in that it comprises at least one step comprised of linking this given software application to memory allocation rules chosen from a set of predefined rules, and in that, when this address correspondence table does not comprise an entry for a contiguous memory address range of virtual addresses associated with this given software application, it comprises a step for generating an exception and a subsequent step for allocating a physical memory location according to one of these memory allocation rules, the choice of the rule being subject to the profile of the virtual memory types used by the given software application.

BRIEF DESCRIPTION OF THE DRAWINGS

The invention will be better understood, and other characteristics and advantages will become apparent, with the reading of the following description in reference to the appended figures, in which.

DESCRIPTION OF THE PREFERRED EMBODIMENTS

To explain the concepts, without in any way limiting the scope of the invention, the context described below will be that of a data processing system whose operating system is "UNIX" or a similar type, unless otherwise stated.

For the applications running in this environment, the virtual address space can be divided into different types, including the following types:

text or program text (executable code);
initialized data;
modified data;
"stacks";
"heap"; that is, dynamic allocation (tables, etc.);
shared memory;
shared libraries.

During the running of an application, the latter uses the different types of system memory equally, in different ways. Moreover, an application or a new instance of the same application can run in either of the two modules Ma or Mb of the system of FIG. 2. What is true for the same application is also true for two applications with different profiles.

Figure 3A:
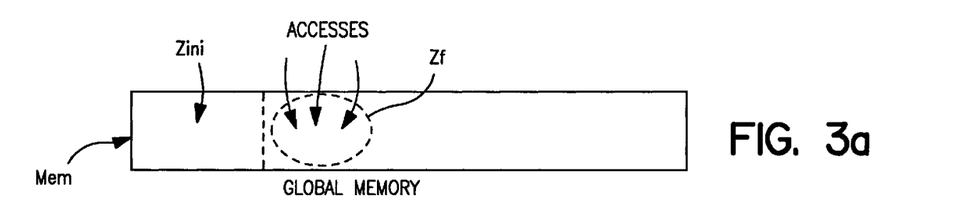
FIGS. 3a and 3b schematically illustrate the accesses to the memory for two exemplary software applications.
Figure 3B:
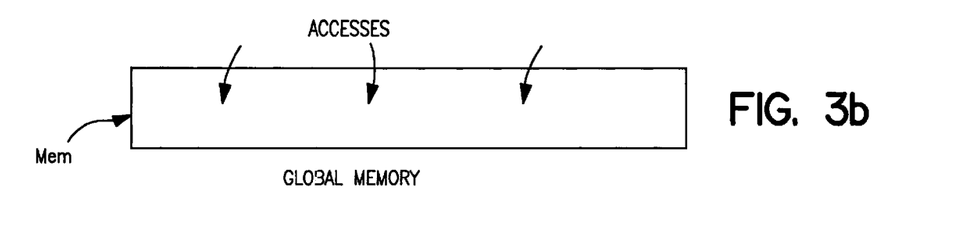

FIGS. 3a and 3b schematically illustrate two types of applications, namely a "mini-database" and a more traditional database.

The global memory of the system is represented in these two figures by the reference Mem.

In the first case, illustrated by FIG. 3a, during an initialization period, the accesses are limited to an address space symbolically represented by the area Zini, arbitrarily located on the left side of FIG. 3a. After that, the accesses occur in an address space, symbolized by an area Zf, also of limited extent and assumed to be related to the area Zini, in the example of FIG. 3a. The physical memory locations for this particular application can therefore be contained in a single module, and more precisely, a local module.

This is not generally the case for a standard database, as illustrated by FIG. 3b. The accesses can extend to the entire memory space, as symbolized by the arrows represented in FIG. 3b. It follows that the locations of the occupied physical memory are generally distributed into two or more modules.

Moreover, as has been indicated, for the same application, the virtual memory space is subdivided into different types of segments: text, data, etc.

Figure 4:
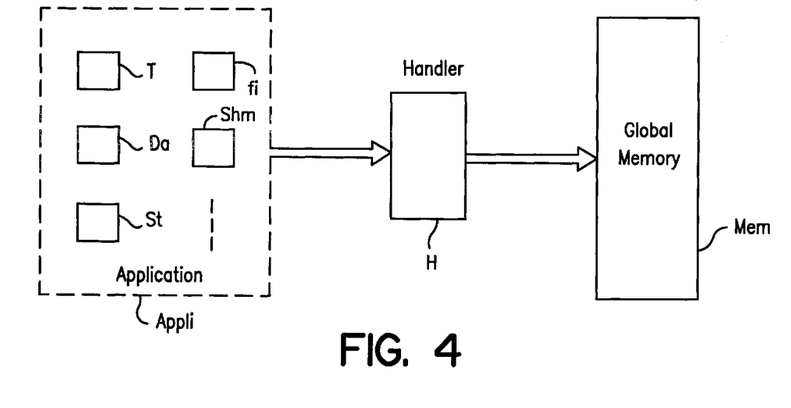
FIG. 4 illustrates an example of a subdivision of a software application.

As a non-limiting example, when a given application (Appli) is running, its various components are partitioned into virtual memory segments: Text (T), Data (Da) (of various types), Stack (St), shared memory (Shm), files (Fi), etc., as illustrated by FIG. 4. Traditionally, a management device, or "handler" H, allocates to these segments of virtual memory locations in the global physical memory (Mem) of the system.

The mechanism for allocating physical memory upon detection of a page fault will be described below.

It has been indicated above that an application in the process of running uses the different types of memory in different ways, equally. Likewise, an application that initially runs in a given module (for example, FIG. 2: Ma) can continue in another module (for example, FIG. 2: Mb), or an additional instance of this application can be created and run in a different module.

Assuming that an application is trying to execute a particular instruction, for example a "load" instruction, at a given virtual address, for example the arbitrary address "$O_x$ 2000," the central processor (for example, FIG. 2: 10a), in which the current process is running, decodes the instruction and an address correspondence table (not represented) is scanned. If the entry being sought is not there, there is a transmission of an exception, which translates into a page fault detected by the handler H. It is therefore necessary, under these circumstances, to allocate a physical memory location for the virtual address "$O_x$ 2000" above.

In the prior art, only one type of allocation exists. In other words, the rules used are the same, no matter what the profile of the application and the type of segment. Therefore, the handler H allocates a physical memory location in accordance with the allocation rules used by the system. For example, according to these rules, the allocation is carried out systematically in the local physical memory, that is, in the memory 14a if the process is running in the module Ma under the control of one of the central processors 10a through 13a. This rule can be advantageous for a text type segment, but not optimal for other types of segments.

Figure 5:
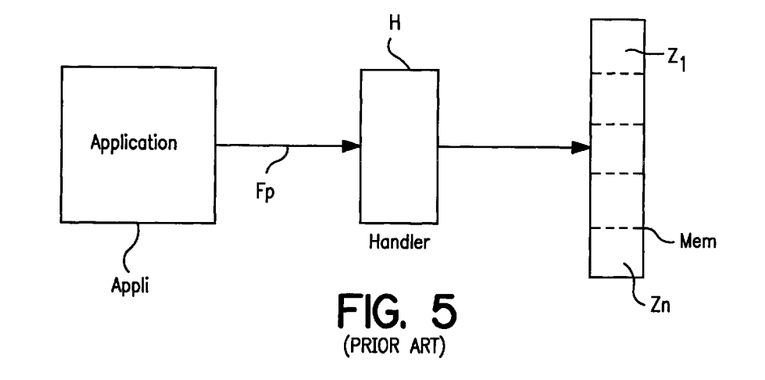
FIG. 5 schematically illustrates the allocation of a memory location according to the prior art, when a page fault is generated.

The above mechanism is illustrated by FIG. 5. The application (Appli) generates a page fault Fp, and the handler H allocates a location in the physical memory Mem (whose partitions, $Z_1$ through $Z_n$, have been symbolized by dotted lines in FIG. 5), according to the predefined rules.

As has also been indicated, these rules can be modified, but they remain the same for all the applications and all the segment types.

On the other hand, according to the process of the invention, the allocation of the physical memory Mem is carried out in accordance with a set of rules that takes into account the profile of the application, and in a preferred embodiment, the page fault type.

Figure 6A:
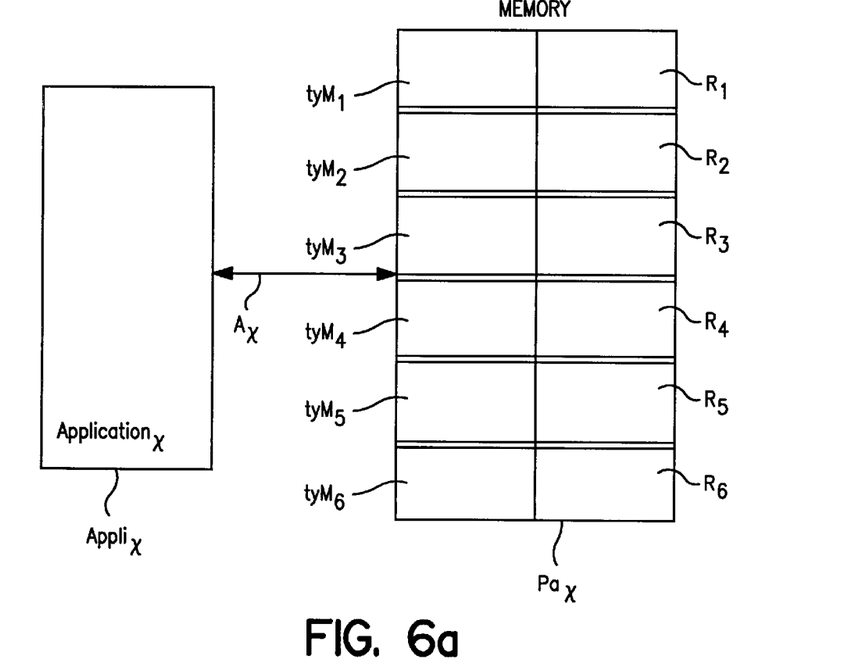
FIGS. 6a and 6b schematically illustrate the allocation of a memory location according to the invention, when a page fault is generated.
Figure 6B:
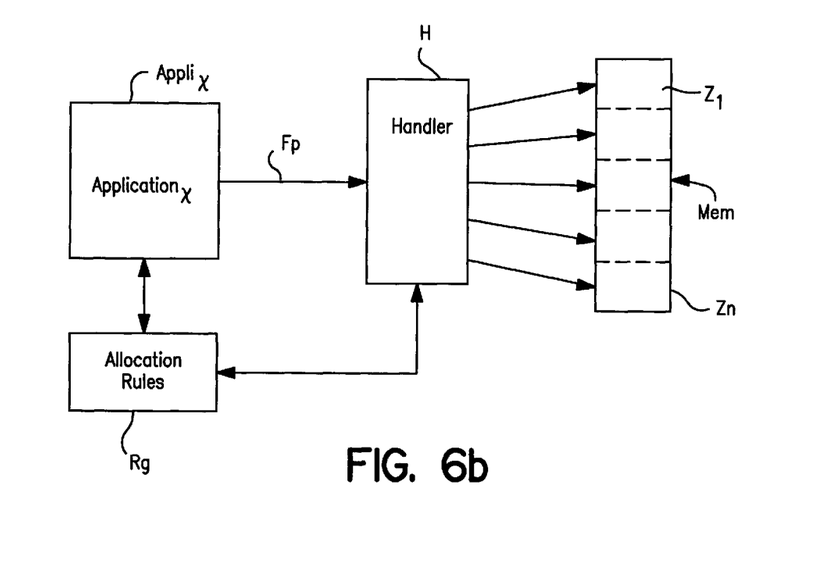

FIGS. 6a and 6b illustrate the mechanism for allocating physical memory according to the invention.

According to a chief characteristic of the process according to the invention, each application is linked to a set of predefined allocation rules. To do this, it is necessary to associate each application $Appli_x$ (x being an arbitrary subscript) with a particular profile. This association is carried out under the control of the operating system, or "OS," which stores it. FIG. 6a schematically illustrates the association mechanism.

This FIG. 6a represents a particular application $Appli_x$. As has been indicated, this application $Appli_x$ uses various types of memory: text, data, etc. In FIG. 6a, six types of memory are represented, which have been labelled $tyM_1$ through $tyM_6$. Each type of memory, $tyM_1$ through $tyM_6$, is linked to one allocation rule from a set of predefined rules, which will be defined below. These rules have been labelled $R_1$ through $R_6$, it being understood that this is not necessarily a set of disjointed rules. In other words, for example, the rules $R_2$ and $R_3$ could be identical, even if the memory types $tyM_2$ and $tyM_3$ themselves are different.

The memory allocation profile $Pa_x$ just defined is linked by an association $A_x$ to a particular application $Appli_x$. The profile $Pa_x$ is a table with two entries: memory types $tyM_1$ and rules $R_j$ chosen from a set of predefined rules, i and j being arbitrary subscripts.

Generally, an association function may be defined as follows:

$$\text{Association\_pa}(Appli_x, Pa_x).$$

The memory allocation profile linked to a given application can be defined upon initialization of the execution of this application or dynamically redefined at any time during the execution, which increases the flexibility of the process.

In FIG. 6b, the predefined allocation rules have been labelled by the general reference $R_g$. During the appearance of an exception which translates into a page fault Fp, that is, when the address correspondence table does not contain an entry for a virtual address, the handler H searches the profile $Pa_x$ of the application $Appli_x$ as just defined. It also determines, in a preferred embodiment, the type of the page fault Fp. Based on these two parameters, it allocates locations in physical memory, $Z_1$ through $Z_n$, which may be local (in the same module), or remote (in another module), or even distributed throughout the entire memory Mem. This distribution, which depends on the profile $Pa_x$ of the application $Appli_x$ and on the type of the page fault Fp, is symbolized in FIG. 6b by multiple arrows, (as opposed to the single arrow of the process of the prior art represented in FIG. 5).

The addressing function $F_{ad}$ can therefore be formalized in the following way:

$$F_{ad}=F(Pa_x, \text{Type Fp}).$$

The choice of the rule to be applied for the memory allocation is therefore the result of the combination of two parameters.

More precisely, a given application $Appli_x$ specifies which allocation rules it requires for each type of virtual memory segment, from among a set of predefined rules. For example, the following segment types are commonly used: "client" segments, "mapping" segments, "permanent" segments, "working memory" segments, and "shared library" segments.

To explain the concepts, without in any way limiting the scope of the invention, the following set of rules may be defined, which are marked by the codes indicated below:

"P_STRIPE": allocation in stripes among the entire physical memory space forming the resource of a given application, distributed in the local memory (same module) or remote memory (different modules), according to a type of method called "round robin";

"P_LOCAL": the physical memory allocated is in the same module as the central processor having caused the page fault;

"P_FIXED": the physical memory allocated is in a predefined module;

"P_DEFAULT" (or "P_NONE"): there is no physical memory allocation rule, so the default rules belonging to the system are used.

For example, the allocation of the "P_STRIPE" type defined above is suitable a priori for segments of the "shared memory" type, while the allocation of the "P_LOCAL" type is suitable a priori for segments of the "working memory" type.

Thus, the process according to the invention makes it possible to best optimize the physical memory allocations as a function of the actual needs of the applications, or more precisely, the particular profiles of the applications. The performance of the data processing system is improved, since the access times to the memory resource are also optimized, at least in terms of average access times. Another advantage is the capability to link any application to the set of predefined memory allocation rules without its being necessary to modify it or recompile it, which would be the case if a new "API" were used, as has been indicated.

Moreover, the present process has great flexibility. It makes it possible, among other things, to function according to the prior art. For example, if allocation rules are not specified or required by a given application, default rules coming from the system can be used ("P_DEFAULT"). Moreover, a "daughter" application can "inherit" memory allocation rules associated with the "mother" application that created it. The same may be said for an additional instance of an application, which is running, for example, in a different module.

It is easy to see that the process of the invention, in the variants just described, offers a significant improvement relative to the prior art, including better performance and great flexibility.

However, as indicated previously, the virtual address space of current multiprocessor data processing systems can be extremely large. Within the framework of the "UNIX" environment, a single segment represents for example 256 MB, or $2^{16}$ pages. Also, it is usual to subdivide the segments, as needed, into virtual "ranges" of variable length. These virtual sub-spaces, even when belonging to a common segment, can be used differently by the various applications to which they are linked. It also follows that, at least for certain types of applications, the implementation of single rules for all of the one or more segments they use, may not be entirely optimal.

As a non-limiting example, a system of the "NUMA" type will be described again, in reference to FIG. 7a. This system, labelled 1", is similar to the system 1' of FIG. 2, but it is assumed to comprise at least three "SMP" modules, Ma, Mb and Mc, interconnected by a link 2". It is also assumed that the module Mc is connected to a disk drive D, by means of a controller and standard input-output circuits, under the single reference I/O$_c$.

Finally, it is assumed that a given application Appli$_x$ is running in one of the processors of the module Ma, for example the processor 10a. This application manipulates, in particular, a segment of the virtual address space of the system 1", arbitrarily labelled Sg$_x$. This segment Sg$_x$ is illustrated schematically in FIG. 7b. For purposes of simplification, it is assumed to comprise only five virtual "ranges," labelled Ra$_1$ through Ra$_5$. In the example described, the virtual range Ra$_2$ is allocated to the above-mentioned application Appli$_x$ and, more precisely, it relates to a table whose capacity is 50 MB, for example. This table relates to a buffer memory of the same capacity, located in one of the physical memories of the system 1". Moreover, in the example described, it is assumed that due to the rules associated with the type of the segment Sg$_x$ and with the profile of the application Appli$_x$, the buffer memory location is physically located in the main memory 14b of the module Mb. It follows that the reading of data by the application Appli$_x$ requires, in particular, two transits through the link 2', which transits constitute operations that are particularly detrimental in terms of processing time.

Figure 7A:
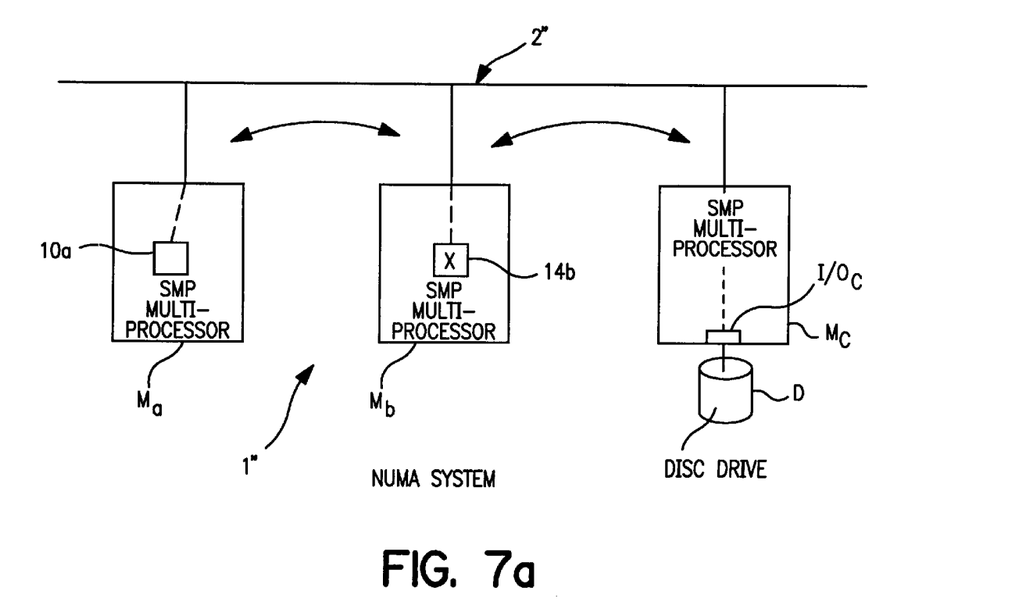
FIGS. 7a and 7b illustrate an additional embodiment of the process according to the invention.

In order to avoid the necessity of a double transit, it would be advantageous for the allocation rules retained for the virtual range Ra$_2$ to impose a location of the 50-MB buffer memory either in the physical main memory of the module Mc (near the circuits I/O$_c$ and the disk drive D), or in the physical main memory of the module Ma, the module in which the application Appli$_x$ is running. Experience shows that, in general, the first solution provides better results from the point of view of performance.

In this simple example, it is easy to see that, even if memory allocation rules adapted to the profile of the applications are implemented according to the process of the invention, even if they are dynamically modifiable, there remain some cases where the process is not fully optimized.

Also, according to an additional aspect of the process according to the invention, in a preferred embodiment, the virtual "ranges" are selectively associated with specific rules.

Figure 7B:
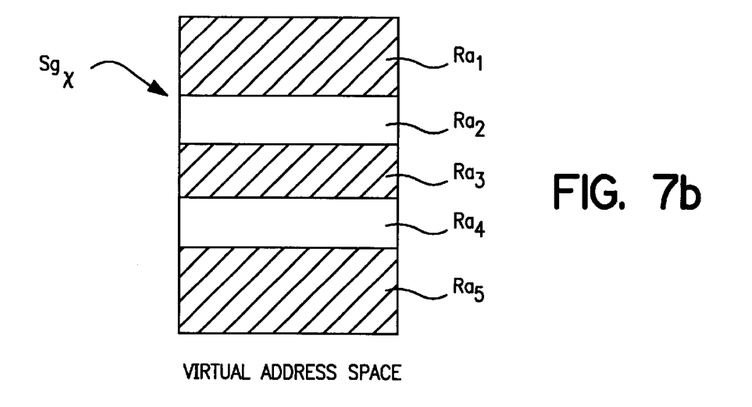

Referring again to the diagram of FIG. 7b, only the virtual ranges Ra$_2$ and Ra$_4$ are considered to be associated with specific rules. To explain the concepts, the virtual range Ra$_4$ can also represent a table, but this time a 100-MB table, for example. The other virtual ranges (represented in hatched lines in FIG. 7b) are not linked to specific rules. In this case, it is the rules associated with the hierarchically higher unit of virtual memory, in this case the segment Sg$_x$, that are applied. This is carried out in the way that is explained above.

More precisely, according to this additional embodiment, supplementary information defining a specific physical memory allocation policy is associated with each virtual range. However, this policy is optional. In effect, the supplementary information comprises a first field, which will be called the pointer "prange," indicating whether, for a segment, at least one specific policy must effectively be applied ("prange"≠0) for a virtual "range," or whether it is the allocation policy associated with it globally that must be applied ("prange"=0).

A second field relates to the policy type. At the level of the virtual range, the set of rules defined above for a global segment are found again: "P_STRIPE", "P_FIXED", etc.

Finally, at least for certain types of memory allocation policies, it is necessary to specify the number or the address of the module in which the physical memory is to be allocated. For this purpose, there is a third field or "module No." field. This is the case for the type "P_FIXED": it is necessary to specify the number of the predefined module. For the type "P_STRIPE," it is also necessary to know the number of the module used previously, in order to increment it according to the law of memory distribution in stripes used ("round robin"). It is therefore necessary to store the number used previously in a memory position, a register or a counter.

Referring again to the diagram of FIG. 7b, the policies for allocating the virtual ranges Ra$_1$ through Ra$_5$ can be identified as follows:

for the virtual ranges Ra$_1$, Ra$_3$ and Ra$_5$, no specific policy, the rules being those of the segment Sg$_x$, for example the type=P_FIXED and the module number=No. of Ma;

for the virtual range $Ra_2$, the existence of a specific policy, with the type=P_FIXED and the module number=No. of Mc, as indicated above;

for the virtual range $Ra_4$, the existence of a specific policy with, for example, also the type=P_FIXED and the module number=No. of Mb.

The process, in the variant that has just been described, makes it possible to best optimize the allocation of physical memory upon detection of a page fault. It requires, as in the preceding variants, a modification of the operating system, but also slight modifications of the applications that use it.

As an example, in the case of read and write instructions of the type known as "bind" in "UNIX" terminology, which must be executed in the module number 3 (for example, the module Mc), with a 50-MB buffer as indicated previously, it is necessary to add into the instruction stream, an instruction which, at the system call, initializes a specific policy for the virtual range used (for example $Ra_2$), which instruction will be called "policy." The latter can have the following form:

policy [address, size (for example 50 MB), policy (for example P_FIXE), module (for example No. 3)]

Although all applications can benefit from this additional variant of embodiment of the process according to the invention, it is not necessary to modify all the types of applications.

It must be noted that those that are not modified can be run normally. The physical memory allocation policy is implemented in the manner described in regard to FIGS. 6a and 6b. The rules used depend particularly on the profile of these applications and are advantageously those defined above, although they could also be different.

On the other hand, the process according to the additional variant is particularly advantageous for applications that manipulate data in the same virtual memory space. Applications of the "driver" type, particularly disk and network "drivers," that is, peripheral or network management programs, may be cited as non-limiting examples. These applications make use of segments of the "data" type in which there are "buffers," memory ranges for which the application has the capability to define specific policies, through an instruction which will be called "system policy."

Other types of applications are particularly affected. These are the applications that communicate with one another by means of shared memories. For example, in the case of a first application that is running in one of the processors of the module Ma of FIG. 7a, and a second application that is running in one of the processors of this same module Ma, which share a first virtual range of a segment of the "shared memory" type, it is advantageous a priori, for performance reasons, for the memory allocation policy type to be either "P_FIXED" or "P_LOCAL," and for the module number to be equal to 1 (module Ma). This disposition would necessarily, a priori, improve the performance of the system. It is therefore useful to assign a specific memory allocation policy to this first virtual range. Likewise, if a third application is running in the module Mb and shares, with the first application, a second virtual range belonging to the same segment of the "shared memory" type, it can be advantageous for the memory allocation policy type to be "P_FIXED" and for the module number to be equal to 2 (module Mb). This disposition would also necessarily, a priori, improve the performance of the system. Therefore, it is also useful to assign a specific memory allocation policy to this second virtual range.

The following describes, in a practical exemplary embodiment, how the process of the invention, in these different variants, can be implemented in a real machine. To explain the concepts, without in any way limiting the scope of the invention, the framework of a machine in a "UNIX" or similar environment will be described.

Figure 8:
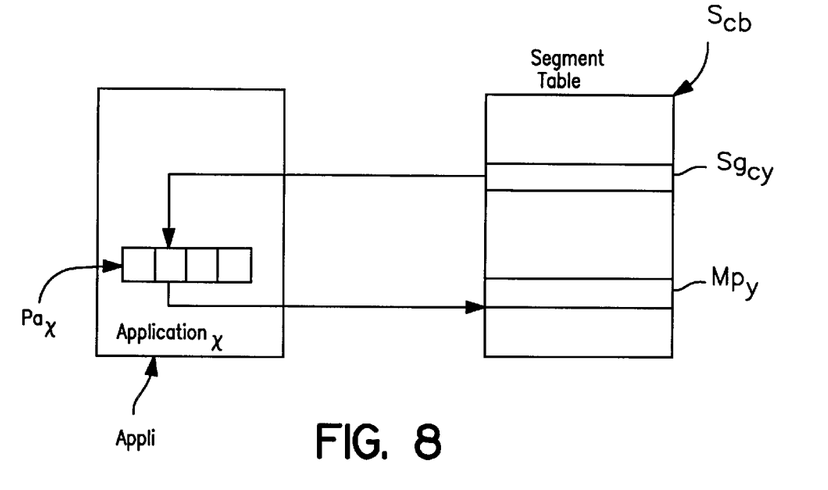
FIG. 8 schematically illustrates a practical exemplary implementation of the variants of the process according to the invention in a digital data processing system.

In this type of machine, there is a table of segments Scb in which data defining these segments, particularly in terms of their types or classes, are recorded, as illustrated schematically in FIG. 8. The process of the invention takes advantage of this characteristic.

In the case of a given application $Appli_x$, its memory profile $Pa_x$ is stored in the structure having created the segments used by this application. The profile $Pa_x$, as shown in connection with FIG. 6a, generally comprises a plurality of memory types. In the case of a given segment, its type is described by a record $Sgc_y$, in the segment table Scb. This type refers to an element of the profile $Pa_x$, which in turn is described, according to the invention, by supplementary data $MP_y$, recorded in the table Scb.

These supplementary data $MP_y$ represent precisely the memory allocation policy to be applied, either at the global level of the segment $Sgc_y$, or at the level of the virtual ranges, which are subdivisions of variable length of this segment. FIG. 8 illustrates the main interactions between a given application $Appli_x$ and the segment table Scb.

In reality, and insofar as an application has been modified to support a specific memory allocation policy at the level of the virtual ranges, there are several sets of supplementary data for each segment.

As indicated above, the supplementary data of each set comprise a plurality of fields: the pointer field "prange" which indicates whether or not there is a specific policy to be taken into account in the segment, a field which will be called "policy_type" which indicates the type of rule to be applied ("P_FIXED", etc.), and a field which will be called "module" which indicates the module number, at least for certain types of rules (for example if the rule is "P_FIXED"). To delimit the various virtual ranges, it is also necessary to have information specifying the virtual addresses of the lower and upper boundaries of these virtual ranges. This information appears in fields which will be called "pno_start" and "pno_end", respectively.

When a page fault is detected, it is then necessary to scan these various data to determine the precise allocation policy to be applied. According to one aspect of the invention, a list structure is adopted for organizing the sets of supplementary data, as illustrated schematically by FIG. 9.

Figure 9:
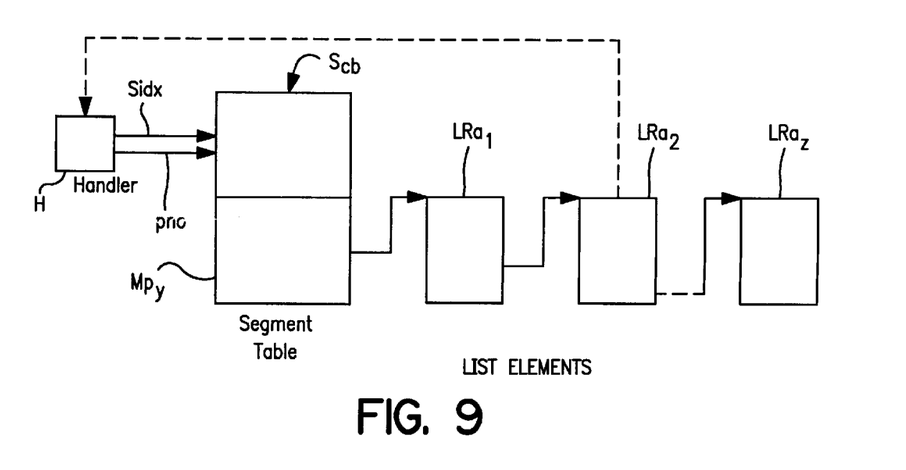
FIG. 9 schematically illustrates a practical exemplary implementation of the additional embodiment of the process according to the invention, according to a first variant.

The addressed segment having caused the page fault is assumed to comprise z virtual ranges. The first memory position of the list structure, in the table Scb, comprises data relative to the segment in its entirety and particularly the global memory allocation policy for this segment. For an unmodified application, only this memory position exists.

The other elements of the list, labelled $Ra_1$ through $Ra_z$, relate to the various contiguous virtual ranges. Thus, for each of the elements, there are the various fields: "policy_type," "module," "pno_start" and "pno_end," for the segments for which the pointer "prange" is different from zero.

The address in the segment having caused the page fault is known. The handler H supplies this address as well as the segment involved, which will be called idx and pno, respectively. These data make it possible to address the table Scb. The comparison of this address pno with the different lower and upper boundaries of each list element, $LRa_1$ through $LRa_z$, (addresses "pno_start" and "pno_end"), makes it possible to determine whether it is necessary to apply a specific memory allocation policy to the virtual range in question, and if so, which type of policy should be applied ("policy_type"), and possibly which module number is involved ("module"), according to the type indicated by the field "policy_type").

These supplementary data are initialized during the creation of a segment, as a function of the profile of the application involved. They can then be dynamically modified by the application, through the above-mentioned instruction of the "system policy" type.

To explain the concepts, and by way of example, the following assumptions were made:

the global policy to be applied to the segment is the "P_LOCAL" type, and therefore a module number is unnecessary, since the allocation takes place in the module where the page fault occurred;

the specific policy associated with the first virtual range, that is, the one recorded in the first element of the list $LRa_1$, comprises the following fields: "policy_type"= "P_FIXED" and "module"=2;

the specific policy associated with the second virtual range, that is, the one recorded in the second element of the list $LRa_2$, comprises the following fields: "policy_type"="P_STRIPE" and "module"=3;

the specific policy associated with the virtual range z, that is, the one recorded in the last element of the list $LRa_z$, comprises the following fields: "policy_type"="P_DEFAULT" and "module"="" (that is, empty).

Naturally, the address fields "pno_start" and "pno_end" are also documented for each of the virtual ranges 1 through z.

If the address pno points to a space determined by the address fields of the list element $LRa_2$, the handler H receives, in response to its request, data indicating a type "P_STRIPE" and a module number 3, or Mc in the example of FIG. 7a. This module number must be incremented (or more generally, modified) since it indicates an allocation that rotates in stripes.

The process according to the variant just described can be improved further. It is actually possible to increase the performance of the system by reducing the time required to determine the memory allocation policy to be applied for a virtual range, upon detection of a page fault. To do this, a variant of the additional embodiment just described uses a table of virtual ranges with calculated addressing, that is, with a so-called "hash" code according to the English terminology.

Figure 10A:
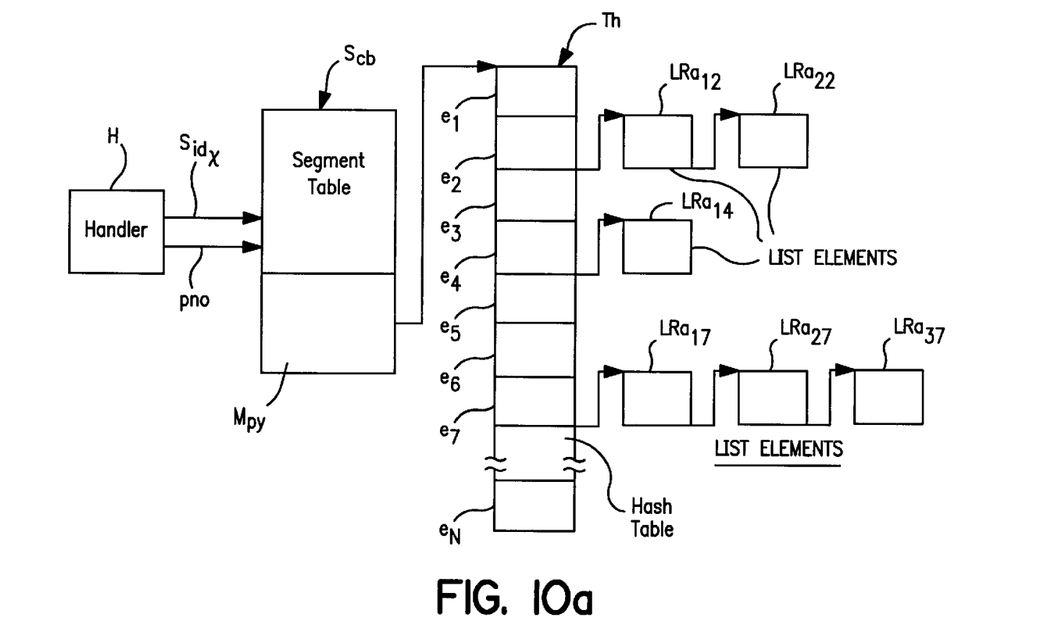
FIGS. 10a through 10c schematically illustrate a practical exemplary implementation of the additional embodiment of the process of the invention, according to a second variant.
Figure 10B:
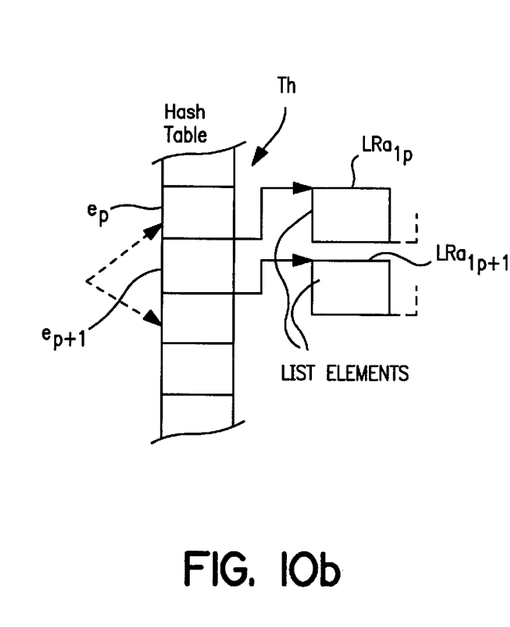
Figure 10C:
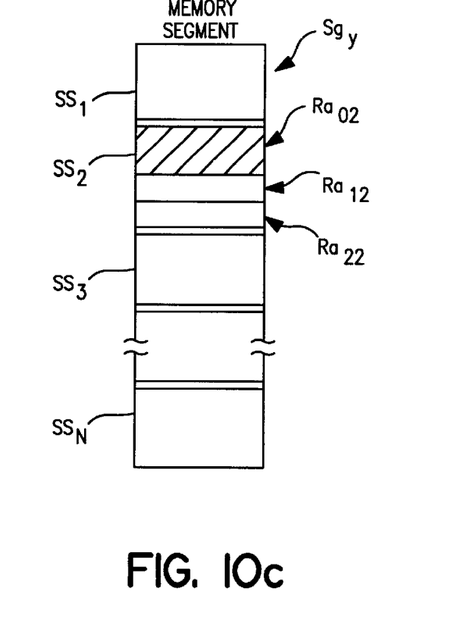

The determination of a specific allocation policy is carried out according to the diagram of FIGS. 10a through 10c. The segments, for example the segment $Sg_y$, y being an arbitrary subscript, are subdivided into N subsegments of fixed lengths. In the above-mentioned "UNIX" environment, a segment representing 256 MB of virtual memory, it is advantageously subdivided into 256 subsegments of 1 MB each, labelled $SS_1$ through $SS_N$ in FIG. 10b, which is advantageous, since it involves a power of 2.

The "hash" table Th (FIG. 10a) also comprises N entries $e_1-e_n$ corresponding to N memory subsegments. Each of the entries stores the memory allocation policy specific to the subsegments $SS_1$ through $SS_N$. An individual list structure is associated with each of the memory locations of the table Th. More precisely, this list structure exists if, and only if, the subsegment in question comprises at least one area belonging to a virtual memory "range" to which a specific memory allocation policy must be applied.

In reference to FIG. 10b, it is assumed that "prange" for the segment $Sg_y$ is different from zero, and therefore that this segment comprises at least one virtual range associated with a specific memory allocation policy.

It is assumed that the subsegment $SS_1$ does not comprise any virtual range associated with a specific policy. This is also the case, in FIG. 10b, for the subsegments $SS_3$ and $SS_N$. On the other hand, it is assumed that the subsegment $SS_2$ comprises three "ranges," $Ra_{02}$ through $Ra_{22}$. The first, $Ra_{02}$, is not associated with a specific policy, while the other two, $Ra_{12}$ through $Ra_{22}$ are associated with specific memory allocation policies, for example "P_FIXED" and "P_STRIPE," respectively.

It follows that the entry $e_2$ of the "hash" table Th is associated with a list structure comprising two elements, $LRa_{12}$ and $LRa_{22}$, which store the characteristics of the two specific policies in the way that is described above.

In FIG. 10a, it is assumed that the entries $e_1, e_3, e_5$ and $e_6$ and $e_N$ correspond to subsegments of (the same rank) which do not comprise virtual ranges associated with specific policies. On the other hand, in addition to the entry $e_2$ already mentioned, the entries $e_4$ and $e_7$ correspond to subsegments comprising virtual ranges associated with specific memory allocation policies. It is noted that the number of elements of each individual list, that is, associated with an entry, is variable. In effect, as has been indicated, the virtual "ranges" do not have a fixed length. In the example illustrated in FIG. 10a, the list structure associated with the entry $e_2$ comprises two elements $LRa_{12}$ and $LRa_{22}$, the list structure associated with the entry $e_4$ comprises one element $LRa_{14}$, and the list structure associated with the entry $e_7$ comprises three elements $LRa_{17}$ through $LRa_{37}$.

When a page fault is detected, the handler H knows the virtual address that caused this page fault in a given segment, for example the segment with the index idx and the address pno, which makes it possible to find the rank of the subsegment, for example the subsegment $SS_2$.

In a first step, the corresponding entry of the table Th is read. There is a strong probability that the policy to be applied can be determined directly in this step, by reading the set of information recorded in the table Th. If this is not the case, only the elements of the list associated with a given entry, which corresponds to the subsegment having caused the page fault, are read, that is, in this case, the elements associated with the entry No. 2. These elements are always limited in number, since they cover only one subsegment, that is, only 1 MB in the example described. As has been indicated, in the preferred application in the "UNIX" environment, the minimal granularity of a virtual "range" is that of a page. The maximum number of ranges per subsegment is therefore, at most, limited to the number of pages comprised in a subsegment (256 in the example).

The process for acquiring the data required to determine a memory allocation policy to be applied is therefore accelerated as a result of the two characteristics just described.

The virtual ranges, as has been indicated, do not have fixed lengths. Certain ranges can also be "astride" two or more consecutive subsegments. This is the case for a range that extends over 50 MB, for example, if a subsegment has a length of 1 MB. This problem can be solved by considering that the ranges themselves can be subdivided into "subranges." This method is not detrimental since, at the moment of their creation, the execution time is not critical. On the other hand, when a page fault is detected, it is necessary for the allocation of a physical memory location to be very fast.

Within the framework of the variant of the additional embodiment just described, and in reference to FIG. 10c, it is assumed, for example, that a page fault has occurred for a virtual address comprised in a given subsegment. It is assumed that the virtual range, at the time of its creation, was subdivided and distributed in two consecutive subsegments, with the arbitrary ranks p and p+1.

In this case, the entries p and p+1 of the "hash" table Th are both initialized through the above-mentioned instruction of the "system policy" type when the virtual address range is created. When a page fault occurs, only one entry of the "hash" table Th is used. It is the one associated with this page fault, that is, once again, the one corresponding to a subsegment (address pno).

If they exist, the list elements associated with these entries $LRa_{1p}$, etc., and $LRA_{1(p+1)}$, etc., respectively, are scanned to determine the memory allocation policy to be applied for the address having caused the above-mentioned page fault.

More generally, multiple entries are used to correspond to a plurality of subsegments, and only one entry is used when a given virtual range is comprised entirely within one subsegment, that is within a virtual sub-space of 1 MB, in the example described.

By reading the above, it is easy to see that the invention clearly achieves the objects for which it is intended.

It also makes it possible to best adapt the utilization of the memory space to the actual needs of the applications, taking into account their specific profiles and the various types of memory that they use. Moreover, in the additional embodiment, a greater degree of optimization can be obtained by descending to a finer level, that is, the level of what has been called the "virtual range," in exchange for slight modifications of the applications using this capability. However, even if this preferred embodiment is effectively implemented in the machine, it is not necessary to modify all types of applications. The unmodified applications can be run as is and benefit from the improvement in performance provided by the first modes of implementation of the process, and the memory allocation policy is the applicable policy at the segment level. It is generally sufficient to modify only the applications for which the expected gain in performance is substantial: applications that manipulate data in a virtual space which it is important to localize, like disk and network "drivers," etc.

It must be clear, however, that the invention is not limited to only the exemplary embodiments explicitly described. In particular, the process is not limited to only the set of predefined memory allocation rules explained in the description.

It must also be clear that, although it is particularly suitable for multiprocessor architectures of the above-mentioned "NUMA" type, the invention is not limited to this type of application only. The process of the invention advantageously applies to any data processing system in which the accesses to the physical memory do not take place in a uniform way, whether or not this memory is distributed among a plurality of machines or modules.

Finally, although it is particularly suitable for an operating system in the "UNIX" or similar environment, it is clear that the process of the invention is not limited to this environment only.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A process for allocating physical main memory locations by mapping with at least one range of contiguous memory addresses in a virtual address space, associated with a given software application ($Appli_x$), the application ($Appli_x$) being run in a data processing system ($1^1$, $1^n$) comprising a non-uniform access memory unit (Mem) and using a plurality of virtual memories ($tyM_1$–$tyM_6$), said mapping being carried out by scanning an address correspondence table, and without modifying at least one of said software applications running in said data processing system, characterized in that said process comprises:

linking said given software application ($Appli_x$) to memory allocation rules (Rg) chosen from a set of predefined rules;

generating an exception (Fp) and allocating a physical main memory location ($Z_1$–$Z_n$) according to one of said memory allocation rules (Rg), when said address correspondence table does not comprise an entry for a contiguous memory address range of a virtual address associated with said given software application ($Appli_x$), the choice of the rule being subject to a profile ($Pa_x$) of said virtual memories ($tyM_1$–$tyM_6$) used by the given software application ($Appli_x$);

wherein said ranges of contiguous virtual memory addresses are subdivided into a plurality of categories causing distinct exception types (Fp), and said process further comprising determining said distinct exception type (Fp), said memory allocation rule being a function of the combination of said profile and said exception type (Fp);

wherein said virtual address space is organized into segments ($Sg_x$, $Sg_y$) associated with said memory allocation rules (Rg);

wherein said segments are subdivided into virtual address ranges ($Ra_1$–$Ra_5$), each being allocated to at least one of said applications ($Appli_x$), and comprising providing a first digital datum, specifying whether there is at least one virtual address range ($Ra_1$–$Ra_5$) with which a specific memory allocation rule is associated, and in at least one second digital datum specifying the nature of said memory allocation rule and providing a third digital datum comprised of an optional number addressing one of said modules (Ma–Mc);

wherein said second digital datum specifies at least one of the following rules:
  a first rule allocating a memory location exclusively in said local memory unit;
  a second rule allocating a memory location by distribution, in slices, in said local memory unit and said remote memory units;
  a third rule allocating a pre-established fixed memory location in said local memory unit or said remote memory units, and
  a fourth default rule, allocating a memory location according to a global memory allocation policy of said data processing system, said fourth rule being the type of one of said first through third rules;

wherein said memory allocation policy records comprise two supplementary fields, a first field storing a digital datum specifying the lower address boundary, in a given segment ($Sg_x$, $Sg_y$), of said virtual address range ($Ra_1$–$Ra_5$), and a second field storing a digital datum specifying the upper address boundary of this virtual address range, and said process further comprises the following phases:
  a preliminary phase comprised of creating, at the request of said applications, for each segment comprising at least one virtual range associated with a specific memory allocation policy, a list structure comprising a number of cascaded elements ($LRa_1$–$LRa_z$) equal to the number of said virtual address ranges ($Ra_1$–$Ra_5$) comprised in said segment ($Sg_x$, $Sg_y$), each element storing said memory allocation policy records as well as said first and second supplementary address fields, and being associated with one of the virtual address ranges ($Ra_1$–$Ra_5$);

a subsequent phase, upon the generation of an exception (Fp) at an address comprised in a given segment ($Sg_x$, $Sg_y$) comprising at least the following steps:

a/ successive steps comprised of reading the digital data stored in said elements of the cascaded list structure ($LRa_1$–$LRa_z$);

b/ for each of the list elements, a step comprised of comparing said address having caused the exception (Fp) with said lower and upper address boundaries, and c/ in case of a positive comparison, a step for reading said second and third digital datum, in order to generate a physical memory allocation instruction in accordance with said rule, and carried out in the module (Ma–Mc) whose number has optionally been specified as a function of this rule, or in the absence of a rule specified by said second digital datum, to allocate a physical memory location in accordance with the memory allocation rules governing the segment ($Sg_x$, $Sg_y$) that includes the virtual address range ($Ra_1$–$Ra_5$).

2. The process according to claim 1, characterized in that, said data processing system (1', 1") is constituted by at least two distinct modules (Ma–Mc), each comprising at least one processor (10a–13a, 10b–13b) and a local physical memory unit (14a, 14b), the memory units located outside one module being called remote memory units with respect to memory units in another module, and said set of predefined rules (Rg) comprises at least the following specific rules for allocating memory upon the generation of an exception (Fp):

a first rule allocating a memory location exclusively in a local memory unit;

a second rule allocating a memory location by distribution in slices in said local memory unit and said remote memory unit, and a third rule allocating a preestablished fixed memory location, in said local memory unit or said remote memory units, in reference to a number assigned to said modules.

3. The process according to claim 1, wherein said data processing system (1', 1") is constituted by at least two distinct modules (Ma–Mc), each comprising at least one processor (10a–13a, 10b–13b) and a local physical memory unit (14a, 14b), the memory units located outside one module being called remote memory units with respect to memory units in another module, and said set of predefined rules (Rg) comprises at least the following specific rules for allocating memory upon the generation of an exception (Fp):

a first rule allocating a memory location exclusively in a local memory unit;

a second rule allocating a memory location by distribution in slices in said local memory unit and said remote memory unit, and a third rule allocating a preestablished fixed memory location, in said local memory unit or said remote memory units, in reference to a number assigned to said modules.

4. The process according to claim 1, wherein said data processing system (1', 1") is constituted by at least two distinct modules (Ma–Mc), each comprising at least one processor (10a–13a, 10b–13b) and a local physical memory unit (14a, 14b), the memory units located outside one module being called remote memory units with respect to memory units in another module, and said set of predefined rules (Rg) comprises at least the following specific rules for allocating memory upon the generation of an exception (Fp):

a first rule allocating a memory location exclusively in a local memory unit;

a second rule allocating a memory location by distribution in slices in said local memory unit and said remote memory unit, and a third rule allocating a preestablished fixed memory location, in said local memory unit or said remote memory units, in reference to a number assigned to said modules.

5. The process according to claim 1, wherein said data processing system (1', 1") is constituted by at least two distinct modules (Ma–Mc), each comprising at least one processor (10a–13a, 10b–13b) and a local physical memory unit (14a, 14b), the memory units located outside one module being called remote memory units with respect to memory units in another module, said set of predefined rules (Rg) comprises at least the following specific rules for allocating memory upon the generation of an exception (Fp):

a first rule allocating a memory location exclusively in a local memory unit;

a second rule allocating a memory location by distribution in slices in said local memory unit and said remote memory unit, and a third rule allocating a preestablished fixed memory location, in said local memory unit or said remote memory units, in reference to a number assigned to said modules.

6. The process according to claim 2, characterized in that it comprises at least one additional predetermined memory allocation rule called a default rule, the memory allocation being carried out in accordance with said default rule when said given software application ($Appli_x$) having caused an exception (Fp) is not linked to any of said specific rules.

7. The process according to claim 2, characterized in that, said given software application ($Appli_x$) comprises at least one memory segment shared with other software applications and accessed in a substantially equal way by said modules (Ma, Mb), and said subsequent step for allocating a location of physical memory (Mem) is carried out in accordance with said second rule by distribution in said local and remote memory units (14a, 14b).

8. The process according to claim 2, characterized in that, said given software application ($Appli_x$) comprises at least one working memory segment accessed locally in one of said modules (Ma–Mc), and said subsequent step for allocating a location of physical memory (Mem) is carried out in accordance with said first rule, the allocation being carried out exclusively in said local memory unit (14a or 14b).

9. The process according to claim 1, wherein at the time of said generation of an exception (Fp) related to an address comprised in said virtual address range ($Ra_1$–$Ra_5$), a step for reading said first digital datum, and a subsequent step comprised of allocating a physical memory location in accordance with the memory allocation rules ruling the segment ($Sg_x$, $Sg_y$) when said exception translates into an addressing of the memory that does not correspond to any of said virtual address ranges ($Ra_1$–$Ra_5$).

10. The process according to claim 1, wherein when said second digital datum specifies said second or third memory allocation rules, said third datum comprised of a module number (Ma–Mc) is determined.

11. The process according to claim 1, wherein said data processing system comprising a table for describing the segments (Scb) comprises a number of entries equal to the number of said segments ($Sg_x$, $Sg_y$) of said virtual space, and further comprises a step for recording said memory allocation policies in said segment description table (Scb) and a step for recording said profiles ($Pa_x$) in virtual memory spaces occupied by said applications ($Appli_x$) that are associated with said profiles.

12. The process according to claim 10, wherein said data processing system comprising a table for describing the segments (Scb) comprises a number of entries equal to the number of said segments ($Sg_x$, $Sg_y$) of said virtual space, and further comprises an initial step for recording said memory allocation policies in said segment description table (Scb) and an initial step for recording said profiles ($Pa_x$) in virtual memory spaces occupied by said applications ($Appli_x$) that are associated with said profiles.

13. The process according to claim 11, characterized in that each of said memory allocation policy records ($Mp_y$) comprises at least a first field for storing said first digital datum, a second field for storing said second digital datum and a third field for storing said third digital datum.

14. The process according to claim 12, characterized in that each of said memory allocation policy records ($Mp_y$) comprises at least a first field for storing said first digital datum, a second field for storing said second digital datum and a third field for storing said third digital datum.

15. The process according to claim 14, characterized in that said memory allocation policy records comprise two supplementary fields, a first field storing a digital datum specifying the lower address boundary, in a given segment ($Sg_x$, $Sg_y$), of said virtual address range, and a second field storing a digital datum specifying the upper address boundary of this virtual address range, and in that said process further comprises the following phases:

a preliminary phase comprised of creating, at the request of said applications, for each segment comprising at least one virtual range associated with a specific memory allocation policy, a list structure comprising a number of cascaded elements ($LRa_1$–$LRa_z$) equal to the number of said virtual address ranges ($Ra_1$–$Ra_5$) comprised in said segment ($Sg_x$, $Sg_y$), each element storing said memory allocation policy records as well as said first and second supplementary address fields, and being associated with one of the virtual address ranges ($Ra_1$–$Ra_5$);

a subsequent phase, upon the generation of an exception (Fp) at an address comprised in a given segment ($Sg_x$, $Sg_y$) comprising at least the following steps:
a/ successive steps comprised of reading the digital data stored in said elements of the cascaded list structure ($LRa_1$–$LRa_z$);
b/ for each of the list elements, a step comprised of comparing said address having caused the exception (Fp) with said lower and upper address boundaries, and
c/ in case of a positive comparison, a step for reading said second and third digital datum, in order to generate a physical memory allocation instruction in accordance with said rule, and carried out in the module (Ma–Mc) whose number has optionally been specified as a function of this rule, or in the absence of a rule specified by said second digital datum, to allocate a physical memory location in accordance with the memory allocation rules governing the segment ($Sg_x$, $Sg_y$) that includes the virtual address range ($Ra_1$–$Ra_5$).

16. The process according to claim 13, characterized in that said memory allocation records comprise two supplementary fields, a first field storing a digital datum specifying a lower address boundary, in a given segment, of said virtual address range ($Ra_1$–$Ra_5$) and a second field storing a digital datum specifying an upper address boundary of said virtual address range ($Ra_1$–$Ra_5$), and in that said process further comprises the following phases:

a first preliminary supplementary phase comprising the following steps:
1/ a first step comprised of subdividing each of said segments ($Sg_y$) comprising at least one virtual range associated with a specific policy for allocating memory in subsegments ($SS_1$–$SS_N$) having the same fixed lengths; and
2/ a second step comprised of creating a table (Th) comprising as many entries ($e_1$–$e_N$) as there are subsegments ($SS_1$–$SS_N$);

a second preliminary supplementary phase comprised of creating, for each subsegment ($SS_1$–$SS_N$) associated with each of said entries, a list structure ($LRa_{12}$–$LRa_{22}$, $LRa_{14}$, $LRa_{17}$–$LRa_{37}$) comprising a number of cascaded elements equal to the number of said virtual address ranges ($Ra_{02}$–$Ra_{22}$) comprised in the subsegment ($SS_1$–$SS_N$), each element storing said memory allocation policy records as well as said first and second supplementary address fields, and being associated with one of the virtual address ranges ($Ra_{02}$–$Ra_{22}$);

a subsequent phase, upon the generation of an exception at an address comprised in a given subsegment ($SS_1$–$SS_N$) comprising at least the following steps:
a/ the reading of said entry of the table (Th) associated with the address having caused said exception and the determination based on said reading of whether or not said subsegment ($SS_1$–$SS_N$) includes a virtual address range ($Ra_1$–$Ra_5$) governed by a specific memory allocation policy, and in case of a negative determination, the utilization of the rule governing said segment ($Sg_y$);
b/ in case of a positive determination, successive steps comprised of the reading of the digital data stored in said elements of the cascaded list structure ($LRa_{12}$–$LRa_{22}$, $LRa_{14}$, $LRa_{17}$–$LRa_{37}$) associated with the entry linked to the address having caused said exception;
c/ for each of the list elements ($LRa_{12}$–$LRa_{22}$, $LRa_{14}$, $LRa_{17}$–$LRa_{37}$), a step comprised of comparing said address having caused the exception to said lower and upper address boundaries;
d/ in case of a positive comparison, a step for reading said second and third digital datum, in order to generate a physical memory allocation instruction in accordance with said rule and carried out in the module number (Ma–Mc) optionally specified as a function of this rule.

17. The process according to claim 14, characterized in that said memory allocation records comprise two supplementary fields, a first field storing a digital datum specifying a lower address boundary, in a given segment, of said virtual address range ($Ra_1$–$Ra_5$) and a second field storing a digital datum specifying an upper address boundary of said virtual address range ($Ra_1$–$Ra_5$), and in that said process further comprises the following phases:

a first preliminary supplementary phase comprising the following steps:

1/ a first step comprised of subdividing each of said segments ($Sg_y$) comprising at least one virtual range associated with a specific policy for allocating memory in subsegments ($SS_1$–$SS_N$) having the same fixed lengths; and 2/ a second step comprised of creating a table (Th) comprising as many entries ($e_1$–$e_N$) as there are subsegments ($SS_1$–$SS_N$)

a second preliminary supplementary phase comprised of creating, for each subsegment ($SS_1$–$SS_N$) associated with each of said entries, a list structure ($LRa_{12}$–$LRa_{22}$, $LRa_{14}$, $LRa_{17}$–$LRa_{37}$) comprising a number of cascaded elements equal to the number of said virtual address ranges ($Ra_{02}$–$Ra_{22}$) comprised in the subsegment ($SS_1$–$SS_N$), each element storing said memory allocation policy records as well as said first and second supplementary address fields, and being associated with one of the virtual address ranges ($Ra_{02}$–$Ra_{22}$);

a subsequent phase, upon the generation of an exception at an address comprised in a given subsegment ($SS_1$–$SS_N$) comprising at least the following steps:

a/ the reading of said entry of the table (Th) associated with the address having caused said exception and the determination based on said reading of whether or not said subsegment ($SS_1$–$SS_N$) includes a virtual address range ($Ra_1$–$Ra_5$) governed by a specific memory allocation policy, and in case of a negative determination, the utilization of the rule governing said segment ($Sg_y$);

b/ in case of a positive determination, successive steps comprised of the reading of the digital data stored in said elements of the cascaded list structure ($LRa_{12}$–$LRa_{22}$, $LRa_{14}$, $LRa_{17}$–$LRa_{37}$) associated with the entry linked to the address having caused said exception;

c/ for each of the list elements ($LRa_{12}$–$LRa_{22}$, $LRa_{14}$, $LRa_{17}$–$LRa_{37}$), a step comprised of comparing said address having caused the exception to said lower and upper address boundaries;

d/ in case of a positive comparison, a step for reading said second and third digital datum, in order to generate a physical memory allocation instruction in accordance with said rule and carried out in the module number (Ma–Mc) optionally specified as a function of this rule.

18. The process according to claim 16, characterized in that, said virtual memory address ranges ($Ra_{02}$–$Ra_{22}$) have variable lengths, and when said length is greater than the length of said subsegments ($SS_1$–$SS_N$) of fixed length, subdividing said virtual memory address ranges into subspaces comprised in subsegments ($SS_1$–$SS_N$).

19. The process according to claim 17, characterized in that, said virtual memory address ranges ($Ra_{02}$–$Ra_{22}$) have variable lengths, and when said length is greater than the length of said subsegments ($SS_1$–$SS_N$) of fixed length, subdividing said virtual memory address ranges into subspaces comprised in subsegments ($SS_1$–$SS_N$).

20. The process according to claim 16, characterized in that said segments ($Sg_y$) extend over a contiguous virtual space of 256 MB, and in that said table (Th) comprises 256 entries ($e_1$–$e_N$), each of which corresponds to a subsegment ($SS_1$–$SS_N$) of 1 MB.

21. The process according to claim 17, characterized in that said segments ($Sg_y$) extend over a contiguous virtual space of 256 MB, and in that said table (Th) comprises 256 entries ($e_1$–$e_N$), each of which corresponds to a subsegment ($SS_1$–$SS_N$) of 1 MB.

22. The process according to claim 18, characterized in that said segments ($Sg_y$) extend over a contiguous virtual space of 256 MB, and in that said table (Th) comprises 256 entries ($e_1$–$e_N$), each of which corresponds to a subsegment ($SS_1$–$SS_N$) of 1 MB.

23. The process according to claim 19, characterized in that said segments ($Sg_y$) extend over a contiguous virtual space of 256 MB, and in that said table (Th) comprises 256 entries ($e_1$–$e_N$), each of which corresponds to a subsegment ($SS_1$–$SS_N$) of 1 MB.

* * * * *